United States Patent
Bruno et al.

(10) Patent No.: US 6,289,088 B1
(45) Date of Patent: Sep. 11, 2001

(54) PAY PHONE CALL COMPLETION METHOD AND APPARATUS

(75) Inventors: Richard Frank Bruno, Morristown; Robert Edward Markowitz, Glen Rock; Bernard Shapiro, Hillsborough, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/468,662

(22) Filed: Dec. 21, 1999

(51) Int. Cl.[7] .................................................. H04M 17/00

(52) U.S. Cl. .......................................... 379/143; 379/202

(58) Field of Search .................................... 379/143, 202; 455/416; 370/260, 261; 709/204

(56) References Cited

U.S. PATENT DOCUMENTS

| | | | |
|---|---|---|---|
| 5,187,740 | * 2/1993 | Swaim et al. | 379/209 |
| 5,353,335 | * 10/1994 | D'Urso et al. | 379/88.05 |
| 5,414,754 | * 5/1995 | Pugh et al. | 379/88.23 |
| 5,995,826 | * 11/1999 | Cox et al. | 455/414 |

* cited by examiner

*Primary Examiner*—Duc Nguyen
*Assistant Examiner*—Barry W Taylor

(57) ABSTRACT

A method for permitting multiple calls in a toll telecommunications network from a pay telephone comprising the steps of 1) receiving a first call in said toll telecommunications network from said pay telephone, 2) determining, the identity of a single carrier of said telecommunications network associated with the first toll-free call, 3) completing the first call to a called party, 4) during processing of the first call and prior to a caller actuating the switchhook of the pay telephone, providing dial tone for a second call by the single carrier associated with the first call, 5) receiving a second telephone number in said telecommunications network from said caller at said pay telephone, 6) determining the identity of the single carrier associated with the second call, and 7) responsive to the identity of the single carrier being the same single toll carrier for the first and second calls, completing the second call without additional fee to a called party of the second call by the single carrier. Associated network apparatus for performing this method comprises an application server and a database, the server most conveniently incorporating either speech recognition or tone signal receivers and a voice querying or response system.

20 Claims, 4 Drawing Sheets

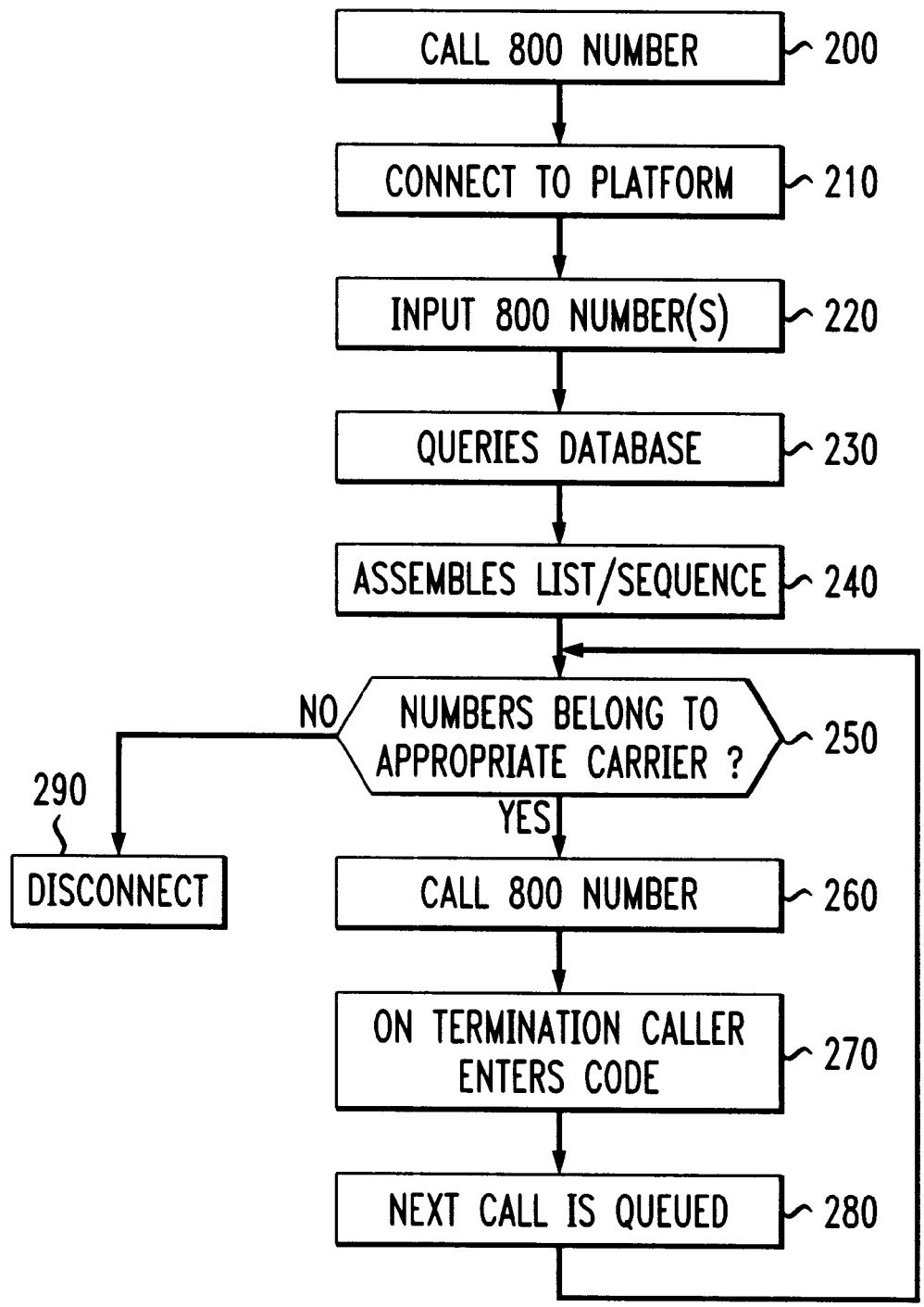

PAY PHONE CALL COMPLETION METHOD AND APPARATUS

BACKGROUND OF THE INVENTION

1. Technical Field

This invention relates to the field of pay telephone call completion and, in particular, to a pay telephone call completion method and apparatus permitting a user to make multiple toll-free calls from a pay telephone through a long distance telephone network associated with the toll-free calls for no extra fee due to the owner of the pay telephone from the caller, the called party or long distance service provider.

2. Description of the Relevant Art

The party associated with a toll-free number, just as every long distance telephone customer in the United States, must select a single preferred carrier to carry the traffic, typically, a long distance toll service provider. For example, a hotel chain owner that wishes to provide toll-free services to its potential guests must select a single preferred long distance carrier that is associated with the toll-free telephone number in memory of a database. Referring to FIG. 1A, a typical toll-free telephone number may be 800-55H-OTEL that is associated with HOTEL and their single selected carrier, for example, XYZ long distance carrier, in memory database 25 of a local telephone service provider (which may also provide toll services) not selected by HOTEL. According to the prior art, a potential hotel guest may go to a payphone 30, for example, in an airline terminal and make a toll-free call to 1-800-55H-OTEL. A local switch LS 20-1, for example, a No. 5 ESS system available from Lucent Technologies, Inc., among other suitable local switching systems, receives the dialed number of the called party (1-800-55H-OTEL) and refers to carrier database 25 to determine the identity of the long distance network 10 of the single selected long distance telephone service provider associated with the dialed toll-free telephone number. The local telephone service provider, typically, a regional telephone company, then refers the call for processing to the associated long distance service provider.

The associated toll carrier and owner of network 10 receives the toll-free telephone number at a toll switch point of ingress to network 10 at ingress switch (IS) 15-1, translates the dialed number to a routing number and determines egress switch (ES) 15-2 from the area code and telephone number of the called party. A tandem switch 15-3 may be required to permit a linking connection for the duration of a call from office 15-1 to office 15-2. The network 10 terminates the call from egress switch 15-2 via the same or another local telephone company service provider and their local switch LS 20-2 to the called party terminal 40.

The owner of the pay telephone 30 from which the call was placed may be any of the local telephone company, a long distance service provider, the airport or yet other entities. The payphone owner is entitled to receive a fee, for example, less than one US dollar, (typically, thirty cents) for the use of the pay telephone 30, even though the caller pays nothing for the call. Some carriers pass the cost to the called party. Thus, the called party, in this example, the hotel operator HOTEL, may be held responsible for at least a portion of the fee that is due and owing to the payphone owner 30 by the associated long distance carrier and owner of network 10.

When the caller has completed their call to a first called hotel operator, for example, to try to obtain a hotel room reservation and wants to make another call because the first hotel operator has no rooms available, the caller typically hangs up, obtains renewed dial tone from the local telephone company service provider for payphone 30 and places a second call. The above process of looking up the associated carrier and charging that carrier a fee for the use of the pay phone is repeated. Consequently, the associated long distance carrier, be it the same carrier or a different carrier, will be responsible for a second fee, the same less than one dollar fee, that would eventually be chargeable at least in part to the second hotel operator.

Thus, with present methods and procedures, whenever multiple calls must be placed via the same associated long distance network, the caller is inconvenienced by the present pay phone call completion process because the caller must hang up, obtain renewed dial tone from the local service provider and make a new call each time the caller wants to dial a new hotel chain operator. The local telephone company service provider is inconvenienced because they have to provide renewed dial tone and perform repeated look-ups in database 25 for long distance carriers associated with each number dialed and repeatedly refer new calls for handling to an associated long distance carrier. And the long distance service provider for the first call via network 10 is inconvenienced because they must repeatedly respond to the local telephone company requests for service and be responsible for multiples of the fee owed to the owner of the pay telephone 30 used to make the first, second and further calls, so long as they are the associated long distance telephone carrier.

Thus, there exists an opportunity in the art for an improved pay phone call completion method and apparatus that eliminates the inconveniences inherent in making many toll-free telephone calls from a pay telephone.

SUMMARY OF THE INVENTION

According to the principles of the present invention, a caller may enter a list of toll-free telephone numbers in a caller preferred sequence: for example, hotel operator A, hotel operator B and hotel operator C. The network operator associated with the call to hotel operator A provides an application server 50 with a database 55, the server being programmed according to the present invention. Once the first call to hotel operator A is referred to network 10, the network 10 can route all the calls from the same pay phone 30 in the preferred sequence so long as network 10 is the single, selected long distance service provider. Thus, at the conclusion of a first call to hotel operator A which may result in not obtaining a room reservation, the network 10 may be signaled, for example, by a special dialed command or voice command indicating the completion of the first call without the caller's having to hang up and to dial the next telephone number and so on until a room reservation is successfully made.

A toll communications network, according to the present invention, may refer to a local telephone company network, a long distance/toll network 10 or a different long distance/toll network 11. Consequently, a method for permitting multiple toll-free calls in a toll telecommunications network from a pay telephone comprises the steps of: 1) receiving a first toll-free call in the toll telecommunications network from the pay telephone, 2) determining the identity of a single carrier of the toll telecommunications network associated with the first toll-free call, 3) completing the first toll-free call to a called party, 4) during processing of the first toll-free call and prior to receiving a signal indicating the termination of a network connection to the pay telephone, for example, the caller actuating the switchhook of the pay telephone, receiving a second toll-free call by the single selected carrier associated with the first toll-free call from the pay telephone, 5) determining the identity of the single carrier associated with the second toll-free call, and 6) responsive to the identity of the single carrier being the same single carrier, completing the second toll-free call without additional fee by the single carrier.

The caller may signal their desire to have the second call routed by using a prearranged dialed tone sequence—such as *N (for next call). Alternatively, the caller may speak a command that is interpreted by a speech recognition unit. The caller may signal the new call by signaling termination of the first, receiving dial tone from the network 10 and dialing the next toll-free telephone number without alerting local switch 20-1. Similarly, in this embodiment, the caller may speak commands that may begin the next call.

If the next call in sequence is associated with another long distance service provider, the network 10 may suggest the caller permit the network to place the next call to a number associated with a customer of the network 10 instead. The process may continue until all the telephone numbers of the dialed sequence of telephone numbers associated with the same long distance service provider has been completed, and then the caller may be routed to the next long distance telephone service subscriber associated with the next telephone number in sequence that is not associated with the first telephone number dialed. Typically, this can only be performed with the agreement of the second carrier. If the caller wants to proceed anyway with the call, the call may be routed (with the agreement of the other long distance service provider) directly to that service provider. At any time, the caller may disconnect but typically after the caller has placed as many toll-free calls associated with the same carrier as they want.

Alternative embodiments and features of the present invention in addition to those briefly described above will become clarified from a reading of the detailed specification in view of the accompanying drawings and the claims which follow.

BRIEF DESCRIPTION OF THE DRAWINGS

FIG. 2A provides a call processing flowchart of one embodiment for programming the application server 50 and network 10 of FIG. 1 to perform the pay phone call completion method of the present invention.

DETAILED DESCRIPTION OF THE PREFERRED EMBODIMENTS

Figure 1A:
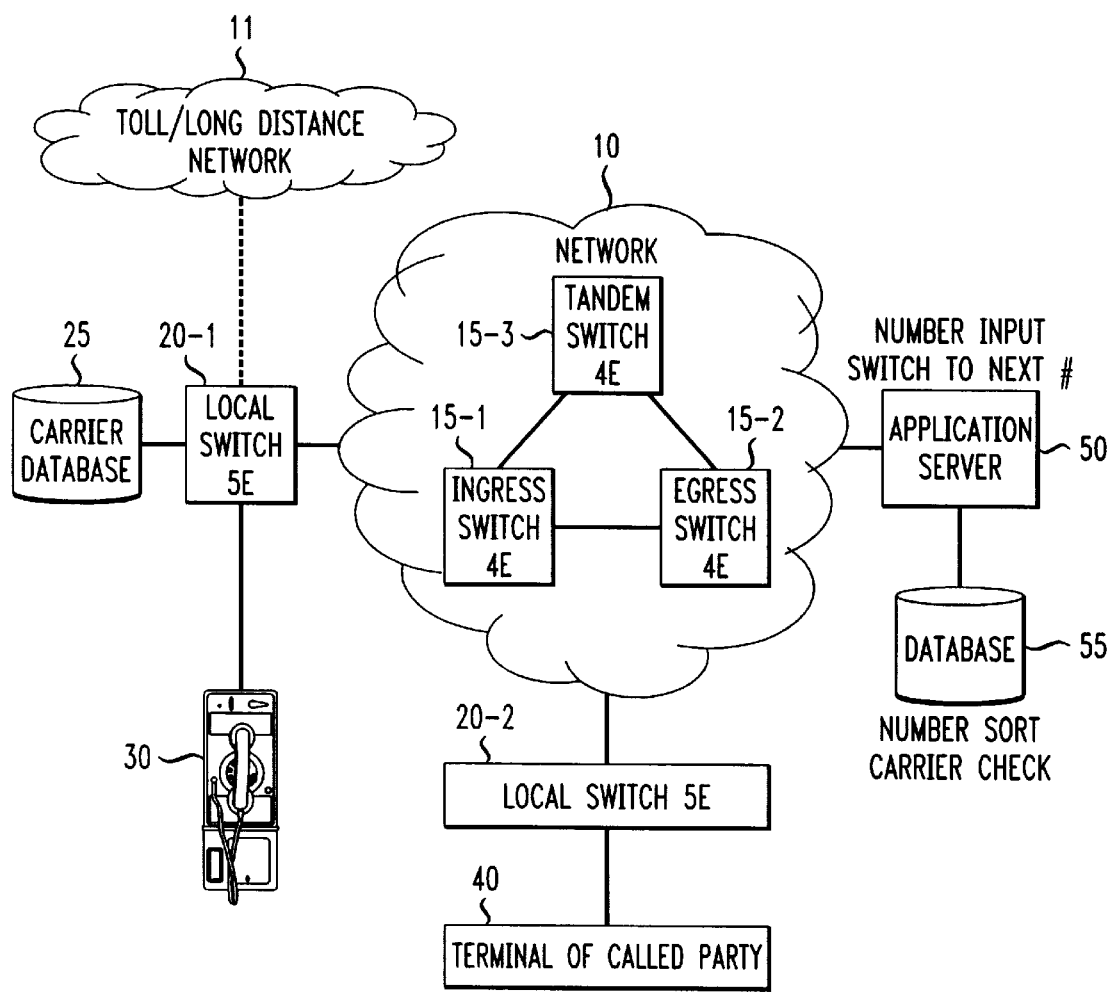
FIG. 1A is a functional system block diagram showing an overview of the network 10 in which an application server 50 and database 55 providing the pay phone call completion method according to the present invention may be operated.

FIG. 1A has already been described above in connection with the placement of a succession of toll-free calls from a pay telephone according to prior art call completion processes. The fees owing and payable to a pay telephone owner may be avoided according to the present invention by the inclusion of an application server 50 which may be a shared network resource within or outside the network or a dedicated resource programmed to perform a pay phone call completion method according to the present invention. The server 50 has an associated database 55 for number sorting and checking on carriers in a similar manner to the database 25 used by a local operating telephone company to check for the identity of the carrier associated with a locally dialed number. The server 50 will be further described in connection with a discussion of FIG. 3.

FIG. 1A shows a calling pay telephone 30 which a user may use to place a tollfree call via a toll/long distance network. Pay phone 30, for example, located in an airline terminal, is linked to local switch LS 20-1 by wired or wireless connection. Local switch 20-1, for example, may be a No. 5 electronic switching system or equivalent system that is associated with a carrier database 25. The local switch 20-1 is adapted to be connected to one of a plurality of toll/long distance networks 10, 11 and so on.

The invention will be discussed in the context of a long distance toll-free call but may be applied to a local telephone carrier as well. When a caller places a toll-free call, according to the present invention, a toll carrier such as toll carrier 10 (or a local telephone carrier) has an application server 50 and associated number sort and carrier check database 55 for providing the caller with the convenience of placing a number of toll-free calls to called parties so long as the called parties have selected network 10 and not another network 11 as their long distance carrier.

Referring to FIG. 2A, after a caller places a first toll-free call at step 200, for example, a 1-800 call, the local telephone carrier refers the call for processing to the toll-long distance carrier 10 after consulting its database 25 if the called party has selected it as the single long distance carrier or refers the call directly to their own application server 50. Network 10 then refers the call to the platform (application server) 50 at step 210.

Figure 2B:
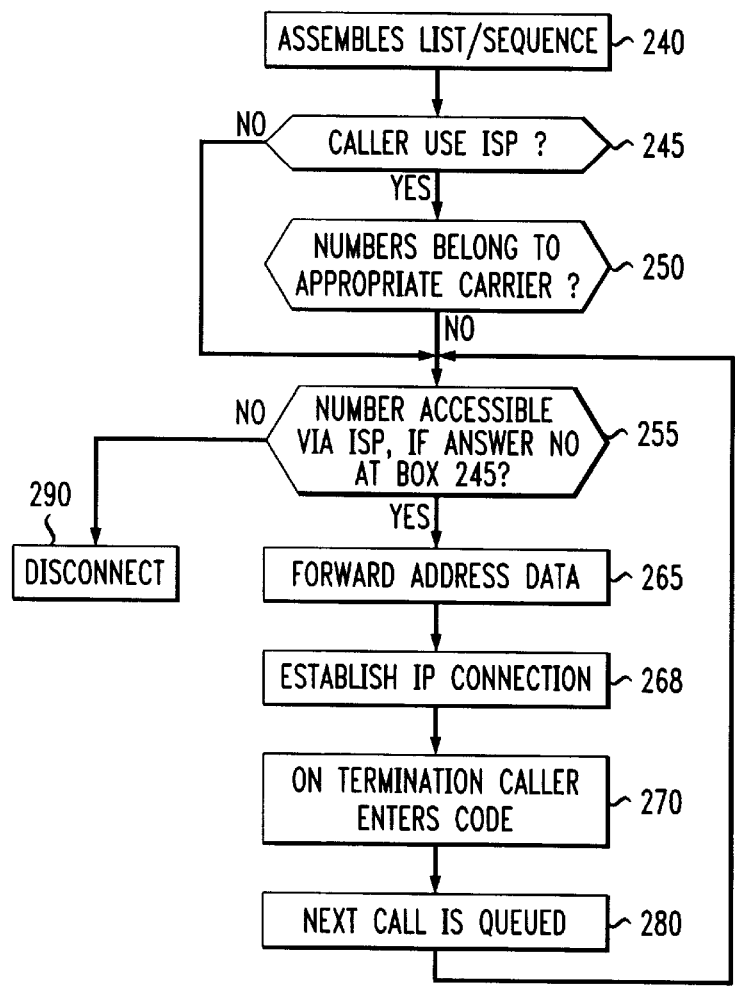
FIG. 2B provides an enhancement to the flowchart of FIG. 2A providing for Internet call completion in addition to circuit switched connection.
Figure 3:
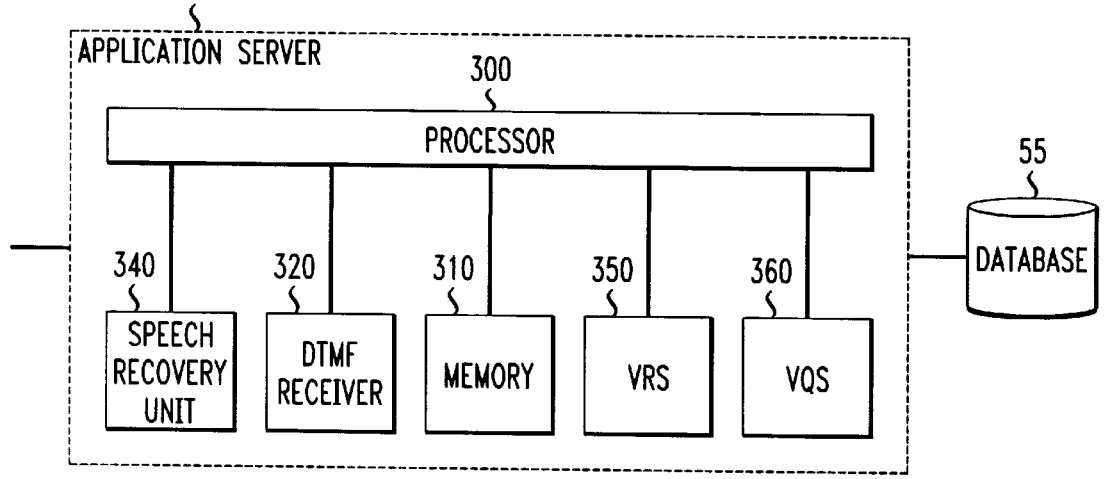
FIG. 3 is a functional block diagram of an application server showing various functional characteristics or building blocks such as tone recognition, speech recognition, called party supervision for hang-up, voice response unit and other alternative means for conducting a dialog with a caller.

Application server 50 is shown in greater detail in FIG. 3 and may comprise a number of functional block items that are conventional in the art: voice query system 360, dual tone multi-frequency receiver 320, speech recognition system 340, voice response system 350, memory 310 and processor 300 as are well known in the art for performing the steps in the flowchart of FIG. 2A. The application server 50 announces itself and asks the caller to input further toll-free telephone numbers in preferred sequence and receives the toll-free telephone number input by the caller at step 220.

The application server 50 then queries its associated database 55 at step 230 for the identities of the toll/long distance carriers selected by the called parties through automatic number identification data forwarded via the SS7 signaling protocol or as received directly from the payphone 30 (in the case of the local telephone company).

At step 240, platform/server 50 associated with the long distance carrier 10 or the local service provider assembles the list and sequence, for example, in the order of its customers first and then asks the calling party if it wants to proceed. The platform/server 50, via the query system 360, may offer to do so before or after connecting the caller to the first called party in the sequence in alternative embodiments.

A loop then begins at steps 250–280 involving processor 300. Referring to its associated database 55, the processor 300, typically within the platform 50, determines at step 250 whether the called telephone number belongs to the appropriate carrier, i.e., the single carrier selected by the customer holding the toll-free number. If yes, then, call processing continues. The call is processed locally or via ingress and egress switches 15-1 and 15-2 and, if necessary, via tandem switch TS 15-3 toward called party 40 via local switch 20-2.

Step 270 represents termination of a call to the first called party. Termination may be detected by any of a number of means. One is by detecting hang-up supervisory signals or other indication of the termination of a network connection to payphone 30 from the called party. Another is by detecting a ring no answer condition or, after a time-out, or other similar detection thereby continuing the process to next call step 280. Another is receiving a signal from the calling party that they have given up on the call, preferably a fixed sequence of dial pad signals, for example, *N, for next call or other unique sequence. Other means for the caller or the network 10 terminating the first call may come to mind and should be encompassed within the scope of the present invention.

At step 280, the next call may be announced via voice query system 360 and call processing initiated. If the called party is associated with the same network 10, then call processing reverts to step 250. If not, the call may be referred to another carrier such as carrier 11 by prearrangement with that carrier for a fee, or another call also in the list associated with the same selected network 10 may be processed with the permission of the calling party. In the simplest embodiment of the present invention, after the caller places the last call in the list, the caller may be prompted one last time if they wish to make another toll-free call and, if not, the caller may terminate the call at disconnect step 290 by hanging up.

Figure 1B:
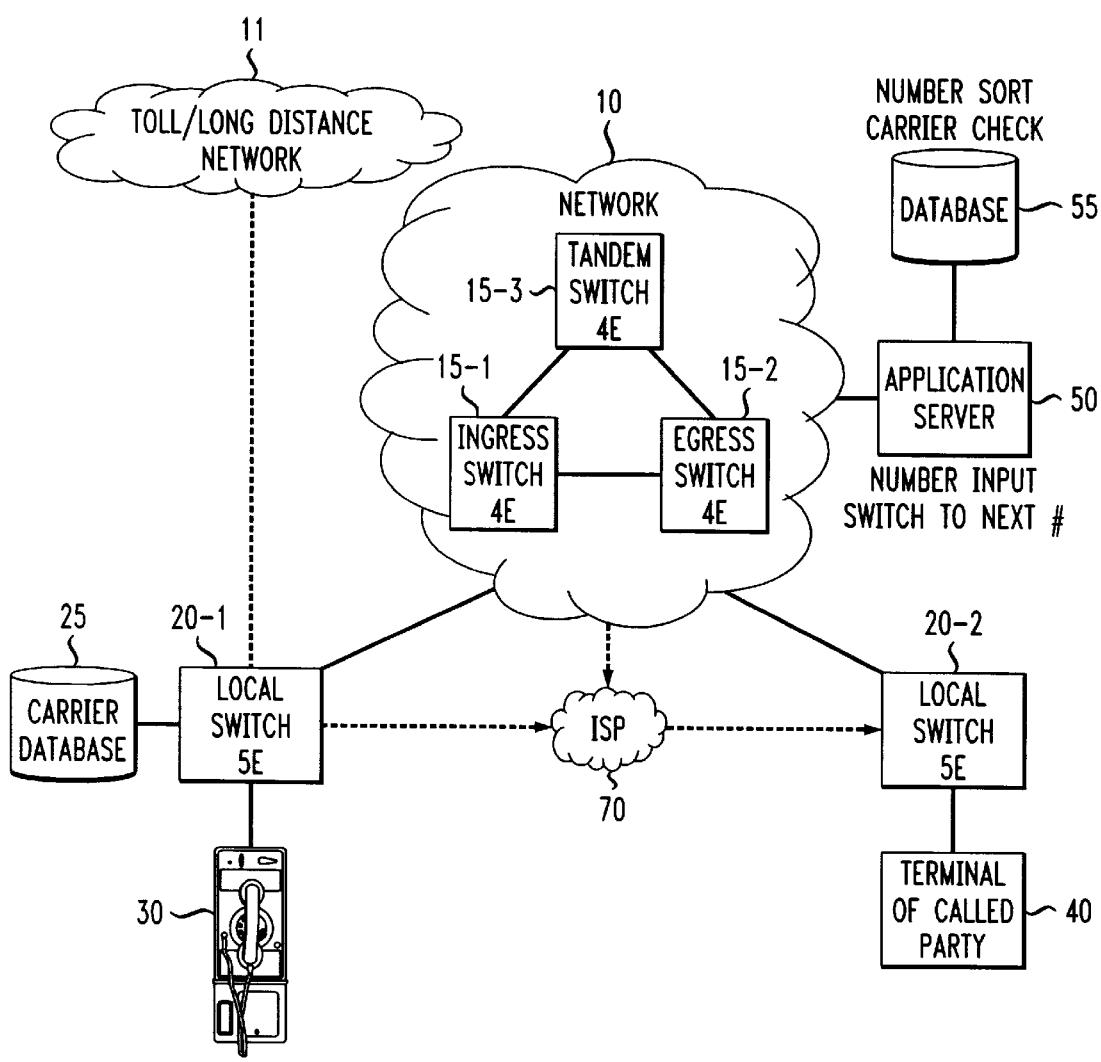
FIG. 1B provides an alternative or enhanced embodiment to the overview of FIG. 1A providing for call completion via an Internet service provider.

As an enhancement to the system described via FIGS. 1A and 2A, a call may be completed via an Internet service provider (ISP) 70 as per FIGS. 1B and 2B. FIG. 1B shows an ISP 70 coupled between either LS 20-1 or long distance network 10 which comprise a portion of or a circuit switched network. respectively. FIG. 2B shows additions to the flowchart of FIG. 2A, both FIGS. 1 and 2 with the same reference numbers referring to the same elements. In this other embodiment, if the next call in the calling party's list is associated with another carrier, for example, carrier 11, at step 250, and the network 10 or LS 20-1 is associated with an internet service provider or ISP 70, the call may be completed via an internet telephony connection to the called party via that ISP 70, the internet connection replacing a standard telecommunications link.

Referring to FIG. 2B, an additional step 245 may be added between steps 240 and 250 to ask the user of the present service if they want to use an Internet service provider to complete a connection. Presently, Internet service may not have the same quality of service in providing a voice telephony call as a switched circuit connection but may offer a less expensive connection. Consequently, the flowchart of FIG. 2B anticipates this decision at step 245. On the other hand, as quality of voice telephony services over the Internet improve, such a question may not be appropriate—the answer could be assumed to be yes, that is, the caller or user would like to use an ISP 70.

Besides the loop at step 250 for a switched circuit connection, there is shown in FIG. 2B a loop including steps 255, 265, 268, 270 and 280 for an Internet protocol connection. Step 255 is a decision box directed to whether or not the desired telephone number of the called party is accessible via the ISP 70. If yes, then, the address data is forwarded at step 265 from the local switch or the long distance network to the ISP 70. At step 268, the IP voice telephony connection is established via ISP 70 bypassing the long distance network which is not a selected carrier. Steps 270 and 280 are the same steps as is FIG. 2A.

The calls can be sequenced and resequenced depending on the caller or user's wishes (not shown) to place internet calls first or last or in the middle in relation to calls via the selected switched circuit carrier and a different carrier. The flowchart of FIG. 2B assumes that calls are placed in the order of selected carrier 10, ISP 70 and alternate switched circuit carrier 11.

Following the typical airport scenario, a caller at payphone 30 may be asked by voice query system 360, if they wish to enter a list of toll-free telephone numbers in preferred sequence. Processor 300, after receiving the list and especially if it is a long list, may resequence the list in preference to customers associated with the network it belongs to with priority over to those called parties associated with it. The caller can accept or reject the resequenced list or can terminate the call at any time. The caller may choose to enter just two telephone numbers and then be prompted "Do you wish to make another toll-free call" after completing the short list of two telephone numbers before the caller disconnects.

The present system may be offered in addition to a number of other possible services offered by the same application server 50. For example, the same server may offer known toll-free directory assistance services by responding to voiced or keyed inputs by calling party 30. Of course, the next call command, for example, *N and other commands associated with the same application server 50 for directory services must be uniquely selected and coordinated. Moreover, announcement of time of day at called location, announcement of carrier and other known services can perform without any additional apparatus or programming by network 10 or the local carrier.

Thus, there has been described a method and apparatus for processing multiple toll-free calls by the carrier associated with the called toll-free numbers without the calling party's having to hang up and redial. The method and apparatus may be further modified or adapted and extended to other third party or collect calls in alternative embodiments and the claims should not be deemed to be limited in scope to exclude such modifications and obvious alternative applications.

What we claim is:

1. A method for permitting multiple calls in a toll telecommunications network from a pay telephone comprising the steps of:

receiving a first toll-free call in said toll telecommunications network from said pay telephone;

determining the identity of a single carrier of said telecommunications network associated with the first toll-free call;

completing the first toll-free call to a called party;

during processing of the first toll-free call and prior to receiving an indication of a desired termination of a network connection to the pay telephone, providing dial tone for a second call by the single carrier associated with the first call;

receiving a second telephone number in said telecommunications network from a caller at said pay telephone;

determining the identity of a single carrier associated with the second call;

responsive to the identity of the single carrier being the same single carrier for the first and second calls, completing the second call by the single carrier.

2. A method as recited in claim 1 further comprising the steps of:

responsive to the identity of the single carrier for the second call being a different single carrier from the single toll carrier for the first call, completing the call via the different single carrier.

3. A method as recited in claim 1 further comprising the steps of:

responsive to the identity of the single carrier for the second call being different from said single toll carrier for the first call, converting the call to an internet protocol telephony call and completing the call via the internet.

4. A method as recited in claim 3 wherein said internet protocol telephony call is sequenced in relation to calls via said single carrier and said different carrier according to user selection.

5. A method as recited in claim 1 further comprising the steps of:

detecting the conclusion of the first call and, prior to receiving an indication of a desired termination of the network connection to the pay telephone, querying the caller if they would like to place another toll-free call via a voice query unit.

6. A method as recited in claim 1 further comprising the step of:

receiving a list of toll-free telephone numbers from said caller comprising first and second toll-free numbers prior to completing the first toll-free call to the called party.

7. A method as recited in claim 6 further comprising the steps of:

receiving a list of toll-free telephone numbers comprising at least a third toll-free number wherein said list comprises two toll-free numbers associated with said single carrier of the first call and completing calls to said two toll-free numbers first.

8. A method as recited in claim 1 further comprising the step of detecting the conclusion of the first toll-free call by detecting the actuation of a switchhook by said called party.

9. A method as recited in claim 1 wherein said first and second calls comprise toll-free calls.

10. A method as recited in claim 1 further comprising the step of offering toll-free directory assistance services.

11. A method as recited in claim 1 wherein said second call completion is provided without additional fee to a called party of the second call.

12. Network apparatus for permitting multiple calls in a toll telecommunications network from a pay telephone, the apparatus comprising:

a network switch for receiving a first toll-free call in said toll telecommunications network from said pay telephone;

an applications server for determining the identity of a single carrier of said telecommunications network associated with the first toll-free call from a database;

said switch completing the first call to a called party;

the applications server during processing of the first call and prior to receiving an indication of a desired termination of a network connection to the pay telephone, providing dial tone for a second call by the single carrier associated with the first toll-free call;

the network switch receiving a second telephone number in said telecommunications network from a caller at said pay telephone;

the applications server determining the identity of a single carrier associated with the second call;

responsive to the identity of the single carrier being the same single carrier for the first and second calls, the network switch completing the second call by the single carrier.

13. Apparatus as recited in claim 12 wherein:

responsive to the identity of the single carrier for the second call being a different single carrier from said single carrier for the first call, the network switch completing the call via the different single carrier.

14. Apparatus as recited in claim 12 wherein:

responsive to the identity of the single carrier for the second call being a different single carrier from said single carrier for the first call, said application server converting the call to an internet protocol telephony call and completing the call via the internet.

15. Apparatus as recited in claim 12 wherein:

upon detecting the conclusion of the first call and, prior to the caller actuating the switchhook of the pay telephone, the application server querying the caller if the caller would like to place another toll-free call via a voice query unit.

16. Apparatus as recited in claim 12 wherein:

said network switch receives a list of toll-free telephone numbers from said caller comprising first and second toll-free numbers prior to completing the first toll-free call to the called party.

17. Apparatus as recited in claim 16 further comprising the steps of:

said network switch receives a list of toll-free telephone numbers comprising at least a third toll free number wherein said list comprises two toll-free numbers associated with said single carrier for the first call and completing calls to said toll-free numbers first.

18. Apparatus as recited in claim 12 wherein said applications server detecting the conclusion of the first toll-free call receives an indication of the termination of a network connection from said called party.

19. Apparatus as recited in claim 12 wherein said first and second calls comprise toll-free calls.

20. Apparatus as recited in claim 12 further comprising a processor for completing the second call without additional fee to said called party by the single carrier.

* * * * *